United States Patent

[11] 3,627,878

[72] Inventor Gerard F. Linsner
 Chicago, Ill.
[21] Appl. No. 681,018
[22] Filed Nov. 6, 1967
[45] Patented Dec. 14, 1971
[73] Assignee Wilson Pharmaceutical & Chemical Corporation

[54] HERBIVORE REPELLENT AND METHOD
 11 Claims, No Drawings

[52] U.S. Cl. .................................................. 424/101,
 424/115, 195/29, 195/111
[51] Int. Cl. ................................................. A61k 17/00
[50] Field of Search .......................................... 195/29, 99,
 100, 102, 103; 424/101, 115; 99/21; 106/2

[56] References Cited
UNITED STATES PATENTS
3,294,564  12/1966  Karjala et al. ................. 99/21

OTHER REFERENCES
Frobisher, M., Fundamental of Microbiology, 7th Ed., 1962, p. 437

*Primary Examiner*—A. Louis Monacell
*Assistant Examiner*—Gary M. Nath
*Attorney*—Dressler, Goldsmith, Clement & Gordon

ABSTRACT: A repellent for animals such as deer and rabbits which is prepared by fermentation of animal blood. Blood fermented using both aerobic and anaerobic bacteria is used in liquid or powder forms in an area to be protected from the herbivores.

HERBIVORE REPELLENT AND METHOD

This invention relates to herbivore repellents. More particularly, it relates to protein compositions derived from animal blood. Still more particularly, it relates to protein compositions prepared by fermenting blood and to the method of preparing such protein compositions.

Briefly, the method of preparing the protein compositions comprises holding blood at a temperature and under conditions favorable to the action of bacteria, i.e., aerobic and anaerobic bacteria, and recovering the product of fermentation.

Animal blood has been suggested as a repellent for rabbits and other herbivorous animals. However, dried bloods, for unexplained reasons, vary widely in their effectiveness as a repellent.

Now it has been discovered that a herbivore repellent of consistent effectiveness can be produced by fermenting of an aqueous blood protein medium using aerobic and anaerobic bacteria, introduced as a pure culture, a mixture of pure cultures or undifferentiated mixtures while maintaining the medium at a temperature in the range between about 60° F. and 120° F.

Starting material for the process may be whole blood or fractionated blood proteins in dilute or concentrated forms, the concentrates generally having a solids content in the range between about 15 percent and about 32 percent. Fresh blood from slaughtered cattle, horses or other animals is sterile. To have an effective fermentation, the aqueous blood protein medium must have an appreciable content of undifferentiated micro-organisms. Such a content may be acquired by contamination from the packing house floor as the blood flows to collection basins or through inoculation of fresh blood with bacteria from previous batches of treated blood, or by inoculation with cultures of aerobic and anaerobic bacteria or combinations thereof.

Conditions to be maintained can be varied to favor growth of one type of bacteria over the other. Increasing the amount of dissolved oxygen in the aqueous blood medium will favor the growth of aerobic bacteria. Thus, aerobic and anaerobic conditions may be maintained for predetermined periods and growth of bacteria controlled irrespective of whether the inoculation is successively with one or the other of the bacterial cultures or with undifferentiated bacteria.

Undifferentiated micro-organisms may be incubated for growth at temperatures between about 60° and 120° F. with intermediate temperatures favoring faster growth.

During incubation, the blood composition is agitated to avoid clumping of the micro-organisms. The necessary agitation may be provided by mechanical stirring or by gas introduced during the fermentation period. Gas introduced for agitation purposes may serve the additional purpose of encouraging the growth of fermenting bacteria but should not be a type that will prevent the growth of the bacteria.

When a blood protein medium containing undifferentiated micro-organisms such as occurs in normal abattoir animal blood collection practices is agitated in a vessel open to the atmosphere, irrespective of whether incubation is being carried out at ambient temperatures or at temperatures maintained in a controlled atmosphere such as in a controlled temperature cabinet, air is incorporated in quantities to foster some action of the aerobic organisms. In the presence of the quantities of air introduced by mild agitation the aerobic bacteria generally reach the peak of activity and the maximum quantities present, in approximately 24 hours. Acceleration of the activity of the aerobic micro-organisms, and shortening of the time of treatment may be accomplished by dispersing air bubbles, preferably in s small bubble form, in the blood protein medium.

When utilizing mild agitation, the anaerobes increase at a slower rate than the aerobic bacteria. The peak quantities of anaerobic bacteria is reached after about 48 hours of controlled incubation using only mild agitation.

In the mild agitation embodiment of the invention, incubation of the bacteria is carried on for about one to eight days after peak development of the various bacteria, with a period of 2–4 days believed preferable for development of the highest concentration of repellent constituents.

After aerobic and anaerobic bacteria activity of a total of 3–10 days in accordance with the mild agitation embodiment of the invention, the resultant aqueous blood medium is preferably sterilized to terminate activity of the micro-organisms. Sterilization may be through thermal treatment or by addition of bacteriocides such as sodium benzoate, (roccal), phenyl mercuric acetate, methyl parasept, and the like.

The resultant aqueous blood medium, with or without sterilization, may be used as is or may be reduced to a solid state. The aqueous medium may be dried using, for example, a vacuum drum dryer, and comminuted. Preferably the fermented blood is absorbed to a carrier such as micronized silica, silica gel, peat moss, clays, vermiculite, and the like. When the resultant aqueous blood medium is adsorbed to carriers, a repellent product is obtained in a dry appearing friable or particulate form.

A dry form of the blood medium containing the products of micro-organism activity or the carrier supported particulate form of repellent material may be used as the contents of cloth sacks to be suspended from trees or structures to be protected or in suspension form in liquid carriers designed for spraying an adherent coating on ornamental shrubbery, for dipping seedlings, and the like, or as a filler material in paints such as a tree whitewash.

The invention will be further understood from the following examples which are given by way of illustration and without any intention that the invention be limited thereto.

EXAMPLE I

Five gallons of whole beef blood of a solids content of approximately 16 percent was collected at the abbatoir. This blood was incubated in a controlled temperature cabinet maintained at 100° F. for a period of 6 days under conditions of mild agitation. Aliquots of the incubated blood were withdrawn at the end of the third and sixth days for comparison of their effectiveness with a controlled sample of the whole beef blood vacuum dried within four hours of collection. As each aliquot of incubated blood was withdrawn from the incubated mixture, the aliquots were mixed with powdered synthetic calcium silicate (micro cel) in a ratio of 7 parts of incubated blood to three parts of the powdered calcium silicate. This mixture was autoclaved in closed containers at 15 p.s.i. steam pressure for 15 minutes. The samples were then shipped to a commercial fruit orchard for evaluation.

EXAMPLE II

Five gallons of pork blood of a solids content of approximately 15 percent was collected at the abbatoir. This blood was incubated in a controlled temperature cabinet maintained at 100° F. for a period of 6 days under conditions of mild agitation. Aliquots of the incubated blood were withdrawn at the end of the third and sixth days for comparison of their effectiveness with a control sample of the whole beef blood dried on a vacuum dryer within four hours of collection. As each aliquot of incubated blood was withdrawn from the incubator, the samples were mixed with powdered synthetic calcium silicate (micro cel) in a ratio of 7 parts of incubated blood to 3 parts of the powdered calcium silicate. This mixture was autoclaved in closed containers at 15 p.s.i. steam pressure for 15 minutes. The samples were then shipped to a commercial fruit orchard for evaluation.

EXAMPLE III

A 5 gallon mixture containing by volume 50 percent of whole beef blood and 50 percent of whole pork blood was processed as described in example I. The bacteria used for inoculation of the blood prior to fermentation being the aerobic bacteria *Alkaligenes faecalis*, *Achromobacter deliculatus* and *Flavobacterium devorans* and the anaerobic bacteria *Clostridium putrefaciens* and *Clostridium bifermentans*.

Aliquots of the incubated blood were withdrawn at the end of 3, 5, 7 and 10 days and reduced to a particulate adsorbed composition as described in example I.

EXAMPLE IV 5 gallons of whole beef blood collected under conditions to maintain the blood as nearly sterile as possible under abattoir conditions was collected for processing. The 5 gallons of blood were inoculated with the aerobic bacteria *Proteus mirabilis* and *Pseudomonas aeruginosa*.

After 2 days of incubation in the control temperature cabinet maintained at 100° F. with mild agitation to avoid agglomeration of materials, the blood mixture was inoculated with the anaerobic bacteria *Clostridium sporogenes* and *Clostridium putraefaciens*, and the agitation reduced to a point minimizing aeration of the incubated material. After 8 days of further incubation under mild agitation conditions, the resulting mixture was withdrawn from the cabinet, mixed with synthetic powdered calcium silicate in a ratio of 6 parts by weight of blood mixture with 3 parts by weight of the silicate. The resulting mixture was autoclaved for 15 minutes at 15 p.s.i. steam pressure for sterilization in the same manner as the products of example I.

EXAMPLE V 5 gallons of blood consisting of a mixture of approximately 50 percent of whole beef blood and 50 percent of whole pork blood was concentrated in a high vacuum evaporator (Zaremba) to a solids content of approximately 28 percent.

This concentrate was inoculated with a mixture of cultured aerobic and anaerobic bacteria which included *Proteus mirabilis* and *Alkaligenes faecalis*. The inoculated blood was incubated at 100° F. for 6 days. At the end of the incubation period the blood was sterilized to arrest bacterial action by heating to 155° F. The sterilized product was passed through a blender to comminute and disperse clumped or coagulated material thereby producing a smooth textured liquid medium. Benzalkonium chloride (Roccal) preservative was added to the liquid medium in a ratio of parts by weight of 2:100.

When the liquid medium of example V is to be used as a spray or a dip solution for seedlings, the applied solution suspension may contain in addition to diluent water, 10 percent to 48 percent acrylic resin or latex emulsion, up to 3 percent synthetic gum thickener such as carboxymethylcellulose, up to 1 percent of antifoaming agent such as hexadecanol ethanol, up to 3 percent of preservative such as sodium benzoate, phenyl mercury salts, etc.

REPELLENT TESTS

Powdered incubated blood products were evaluated as herbivore repellents by packing the various products of examples I, II and III in cheesecloth sacks and attaching the sacks to trees in fruit orchards.

A small sack containing 2 ounces of powdered blood product was suspended in the center of each fruit tree in areas where browsing by deer had been causing damage to the trees.

In the table below, the evaluation is compiled for various nonfermented blood samples indicated as control samples and products of various periods of fermentation for the various blood compositions.

TABLE I

Evaluation of Blood Products as Deer Repellent

| Designation | Total Trees Tested | Trees Browsed | % |
|---|---|---|---|
| Example I—Control | 3 | 3 | 100 |
| Example I—3 Day Ferment | 8 | 0 | 0 |
| Example I—6 Day Ferment | 9 | 1 | 11.1 |
| Example II—Control Pork Blood, 0 Day | 3 | 3 | 100 |
| Example II—control Pork Blood, 3 Days | 8 | 2 | 25 |
| Example II—Fermented Pork Blood, 6 Days | 9 | 2 | 22.2 |
| Example III—Control 0 day | 3 | 3 | 100 |
| Example III—Fermented Mixed Bloods, 3 days | 7 | 2 | 28.6 |
| Example III—Fermented Mixed Bloods, 5 days | 6 | 0 | 0 |
| Example III—Fermented Mixed Bloods, 7 days | 7 | 2 | 28.6 |
| Example III—Fermented Mixed Bloods, 10 | 6 | 1 | 16.6 |

It will be seen from table I that the control samples were ineffective in preventing damage to trees. Comparison of the fermented bloods shows that bloods fermented using undifferentiated micro-organisms for about 5 days or more are effective repellents.

The product of example III was also tested as a protective dip for conifer seedlings planted in reforestration areas.

The solution for dipping was prepared by mixing acrylic resin emulsion, water and the product of example III produced by 5 day fermentation so as to contain 6 percent by weight of the total suspension of the blood product and 10 percent by weight of resin. The field test was conducted by dipping 125 seedlings and planting the dipped seedlings in rows of 25 trees with the dipped seedlings interspersed with untreated seedlings in the test area.

Results are shown in table II below in which the dipping solution was proven to be nonphytotoxic.

TABLE II

| | Number of Trees Available | Number of Trees Damaged |
|---|---|---|
| 2-0 Ponderosa Pine | | |
| Blood Repellent | 123 | 14 |
| Control (untreated) | 106 | 61 |
| 2-0 Douglas Fir (1) | | |
| Blood Repellent | 123 | 0 |
| Control (untreated) | 124 | 10 |
| 2-0 Douglas Fir (2) | | |
| Blood Repellent | 124 | 67 |
| Control (untreated) | 125 | 100 |

The fermented blood products are effective against herbivorous animals other than deer.

To test the reaction of beavers to the repellent, a test ground was chosen where beaver had built a dam against a bridge and repeated efforts toward manually breaking the dam were followed by complete rebuilding of the dam each night.

When the beaver dam was broken, 2 ounce samples of the fermented blood of example I (6 day ferment) were hung in cloth sacks affixed to the bridge stringer 6 feet apart. Additional sacks were affixed to posts on both the upstream and downstream sides of the dam. All beaver activity ceased at the site during a 10-day period of observation that followed.

The primary advantage of the product is the uniformity and reproducibility of the repellent results obtainable with the various fermented blood protein products.

The foregoing description is given for clearness of understanding and no unnecessary limitation should be understood therefrom because modifications will be obvious to those skilled in the art.

I claim:

1. A method of preparing a herbivore repellent from aqueous blood in dilute or concentrated form which comprises introducing into said solution undifferentiated bacteria containing at least one member selected from the group consisting of *Alkaligenes faecalis, Achromobacter deliculatus, Flavobacterium devorans, Clostridium putrefaciens, Clostridium bifermen-*

*tans*, *Proteus mirabilis*, *Pseudomonas aeruginosa* and *Clostridium sporogenes*, maintaining said solution at a temperature in the range between about 60° F. and about 120° F. for a period of 1 to 10 days, agitating the solution for at least part of said period of 1 to 10 days to maintain conditions conducive to growth of aerobic bacteria and to formation of a solids suspension and mixing said resultant solids suspension with dry absorbent particulate carrier in quantities whereby the liquid is absorbed and the solids are adsorbed to said particulate carrier to obtain a product in dry appearing friable form.

2. A herbivore repellent comprising a liquid animal blood containing the products of activity of aerobic and anaerobic bacteria, said products of activity resulting from incubation of said blood at a temperature in the range of between 60° F. and about 120° F. for a period of between 1 and 10 days, said blood during at least a portion of said total incubation period having therein aerobic bacteria containing at least one member selected from the group consisting of *Alkaligenes faecalis*, *Achromobacter deliculatus*, *Flavobacterium devorans* and *Pseudomonas aeruginosa* and being agitated for at least a pat of said period to maintain conditions conducive to growth of aerobic bacteria, and during at least a portion of said total incubation period during which aeration is minimized having therein anaerobic bacteria containing at least one member selected from the group consisting of *Clostridium putrefaciens*, *Clostridium bifermentans*, *Proteius mirabilis* and *Clostridium sporogenes*.

3. A herbivore repellent comprising a liquid animal blood product according to claim 2 which is adsorbed to a particulate carrier.

4. A herbivore repellent comprising a liquid animal blood product according to claim 2 which is adsorbed to a synthetic powdered calcium silicate.

5. A herbivore repellent according to claim 2 in which the animal blood is selected from the group consisting of beef blood and hog blood and mixtures thereof.

6. A method of preparing a herbivore repellent from aqueous blood in dilute or concentrated form which comprises incubating said aqueous blood at a temperature in the range between about 60° F. and about 120° F. for a period of 1 to 10 days, said aqueous blood being incubated having present in it during at least a portion of said incubation period aerobic bacteria containing at least one member selected from the group consisting of *Alkaligenes faecalis*, *Achromobacter deliculatus*, *Flavobacterium devorans*, and *Pseudomonas aeruginos* and being agitated for at least part of said period to maintain conditions conducive to growth of aerobic bacteria, and said aqueous blood being incubated having present in it for at least a portion of said incubation period during which the agitation is under conditions minimizing aeration, anaerobic bacteria containing at least one member selected from the group consisting of *Clostridium putrefaciens*, *Clostridium bifermentans*, *Proteus mirabilis* and *Clostridium sporogenes*.

7. The method according to claim 6 wherein the temperature is maintained between 90° F. and 110° F.

8. The method according to claim 6 in which the aqueous blood is selected from the group consisting of beef blood, hog blood and mixtures thereof.

9. The method according to claim 6 in which the aqueous blood contains a concentrate of animal blood having a solids content in the range between 15 percent and 32 percent.

10. A method of preparing a herbivore repellent according to claim 6 wherein the incubated aqueous blood is dehydrated to convert it to a particulate solid form.

11. A method of preparing a herbivore repellent according to claim 6 wherein the incubated aqueous blood is sterilized to terminate the activity of said bacteria.

* * * * *